United States Patent [19]
Sokolov et al.

[11] 3,933,713
[45] Jan. 20, 1976

[54] METHOD FOR PREPARING AROMATIC POLYESTERS

[76] Inventors: Lev Borisovich Sokolov, ulitsa Truda, 18, kv. 35; Tatyana Vladimirovna Kudim, ulitsa Feigina, 16, kv. 10, both of Vladimir, U.S.S.R.

[22] Filed: Sept. 24, 1974

[21] Appl. No.: 508,914

[52] U.S. Cl. ... 260/29.2 E; 260/30.4 R; 260/32.8 R; 260/34.2; 260/47 C
[51] Int. Cl.² ................. C08G 63/40; C08L 67/02
[58] Field of Search ............ 260/29.2 E, 47 C, 34.2

[56] References Cited
UNITED STATES PATENTS

| | | | |
|---|---|---|---|
| 3,028,364 | 4/1962 | Conix et al. | 260/47 C |
| 3,216,970 | 11/1965 | Conix et al. | 260/47 C |
| 3,234,168 | 2/1966 | Hare | 260/47 C |
| 3,828,006 | 8/1974 | Thomas | 260/47 C |

*Primary Examiner*—Donald E. Czaja
*Assistant Examiner*—H. H. Fletcher
*Attorney, Agent, or Firm*—Waters, Schwartz & Nissen

[57] ABSTRACT

The method for preparing aromatic polyesters consists in the interaction between bis-phenols and dihalogenanhydrides of aromatic dicarboxylic acids taken at a molar ratio from 0.9 to 1.1, at a temperature from −10 to +30°C, in the presence of alkali taken in the quantity of 2 − 2.5 moles per mole of bis-phenols, in a system water-organic liquid, at their volume ratio from 0.2 to 5; said organic liquid is capable of dissolving dihalogenanhydrides of dicarboxylic acids, is chamically inactive towards the starting components, and is miscible with water in the quantity of not less than 25 per cent. The process is carried out in the presence of water-soluble salts of metals standing in the first and the second groups of the Periodic System, taken either separately or in combination, in the quantity from 5 to 45 per cent by weight with respect to the weight of water taken for the reaction. The reaction mixture which is formed, is emulsion containing the end product. The emulsion is ready for direct use.

The end product in the form of solution can also be obtained. To that end the reaction mixture containing the end product is allowed to stand to separate into two phases, namely into an aqueous and an organic phase. The organic phase is a solution of the end product in a mixture with the organic liquid and water. The settled out phases are separated. The obtained solution is ready for direct use.

The end product can also be prepared in the form of powder, for which purpose the reaction mixture, containing the end product is mixed with water in the quantity from 30 to 200 per cent of the volume of the reaction mixture. The obtained suspension is passed through a filter to isolate the end product.

The proposed method provides for the preparation of high-molecular aromatic polyesters at yields to 99.7 per cent.

3 Claims, No Drawings

METHOD FOR PREPARING AROMATIC POLYESTERS

The invention relates to methods for preparing aromatic polyesters.

Said polyesters are widely used in electrotechnical, electronic, radio, aircraft and machine-building industries.

Plastics on the basis of aromatic polyesters have high strength, possess good dielectric properties, thermal stability, water resistance, and are therefore used in the manufacture of articles for electro-, and radio-engineering industry, e.g., for the manufacture of coil formers, bodies of capacitors, relays, etc.

Films made of such polymers are good insulating materials for electric motors (inter-layer, slot, lamellar insulation) and for transformers. They can also be used for preparing capacitors.

Aromatic polyesters can be used also as binding material for antifriction self-lubricating plastic articles working in vacuum without lubricants, for preparing fibres, adhesikes and foams standing temperatures to 300°C.

Known in the prior art are a few methods for preparing aromatic polyesters: (a) by polycondensation of bis-phenols with dichloroanhydrides of aromatic dicarboxylic acids in high-boiling solvents at elevated temperatures; (b) by polycondensation of bis-phenols with dichloroanhydrides of aromatic dicarboxylic acids in a medium of organic solvents in the presence of tertiary amines.

Disadvantages inherent in these methods are the presence of admixtures that are difficult to remove from the polymers after their synthesis, these admixtures may be residual quantities of the catalyst, or they may appear as a result of prolonged heating of the reaction mixture at high temperatures. These admixtures affect much adversely the quality of the end product to decrease its thermal stability, impair physico-mechanical characteristics and working behaviour.

Known also is the inter-phase method for preparing aromatic polyesters by the interaction of bis-phenols and dihalogenanhydrides of aromatic dicarboxylic acids in the presence of alkali. The synthesis is carried out in the system water-organic liquid, which is capable of dissolving the dihalogenanhydrides of dicarboxylic acids, is chemically inactive with respect to the starting reactants of the system, and is immiscible with water.

According to this method, bis-phenol and alkali, for example NaOH or KOH, taken in the quantity of 2–3 mole per mole of bis-phenol, are dissolved in water. Dihalogenanhydride of aromatic dicarboxylic acid is dissolved in an organic liquid, for example, in chloroform, or xylene. Bis-phenol and dihalogenanhydride are taken in equimolar ratio (or close to it). The obtained solutions are poured together and stirred. The process is carried out predominantly in the presence of an emulsifying agent and a catalyst, viz., salts of quarternary ammonium bases.

This method has some advantages. Thus, the reaction can be carried out at room temperature, the process proceeds at high rates. But there are also disadvantages in this method which reside in that the yield of the end product is rather low (80 – 90 per cent), the molecular weight is also insufficiently high (the logarithmic viscosity 0.3 – 0.8). Furthermore, the polyester obtained is contaminated with admixtures, e.g., remnants of the catalyst and emulsifying agent.

This involves thorough washing of the polymer which is complicated by the fact that the polymer, after synthesis, is impregnated with the organic liquid which is insoluble in water. Due to incomplete reaction (the yield of the product is 80 – 90 per cent) the mother liquor and the effluents contain great amounts of unreacted monomers, the catalyst, emulsifying agent, which involves additional operations on special complicated plants where the effluents are purified and the monomers are recovered.

The object of this invention is to provide a method for preparing aromatic polyesters that would make it possible to prepare high-molecular end product at high yield.

Another object of the invention is to simplify the process for preparing and treating the end product.

In accordance with these and other objects, the invention consists in that bis-phenols interact with dihalogenanhydrides of aromatic dicarboxylic acids taken in the molar ratio from 0.9 to 1.1, at room temperature from $-10°$ to $+30°C$, in the presence of alkali taken in the quantity of 2 – 2.5 mole per mole of bis-phenols, in the system water-organic liquid at their volumetric ratio of 0.2 to 5, said organic liquid being capable of dissolving dihalogenanhydrides of dicarboxylic acids, chemically inactive towards the starting components, and miscible with water in the quantity not less than 25 per cent. The interaction between the starting components is realized in the presence of water-soluble salts of metals, standing in the first and second groups of the Periodic System, taken either separately or in combination, in the quantity from 5 to 45 per cent of the water weight; as a result, a reaction mixture containing the end product is obtained.

The introduction of said salts under the adopted conditions of realizing the proposed method, in particular in the presence of said organic liquid, changes the ratio of the main and side processes so that polyesters are produced at high yields, and their molecular weight is high, too. The polymer can be readily washed out of the organic liquid, and it contains no admixtures.

Bis-phenols, according to the invention, may be of various structure, containing both OH groups in one benzene nucleus (for example, resorcinol); binuclear, containing OH groups in various benzene nuclei (for example, 4,4'-dioxydiphenylpropane); binuclear, containing OH groups in various benzene nuclei which are separated by a carbon atom with a complex lateral substitute, for example, phenolphthalein 9,9' (4-oxyphenyl)fluorene; polynuclear bis-phenols containing, in addition to the OH groups bonded to the benzene nuclei, also aliphatic OH groups, for example, 2-$\beta$-oxyethyl-3-3'-bis (4-oxyphenyl) phthalimidine, and also mixtures of bis-phenols of the above-named classes.

The starting dihalogenanhydrides of aromatic dicarboxylic acids, according to the invention, can be dihalogenanhydrides of aromatic dicarboxylic acids of various structures: phthalic (for example, iso- and terephthalic acid), aromatic dicarboxylic acids of the biphenyl series (for example, diphenyloxide of 4-4'dicarboxylic or diphenylhexafluoropropane-4,4' dicarboxylic acid); aromatic dicarboxylic acids with condensed nuclei (for example, 2,6-naphthalenedicarboxylic acid), and also their mixtures.

The alkalis that are introduced into the system, are alkalis that can convert bis-phenol into ionic form (for example, NaOH, KOH, LiOH, and others). The quantity of the alkali added is from 2.0 to 2.5 moles per mole of bis-phenol or a mixture of bis-phenols, i.e., with a small excess which is necessary to neutralize acid formed in the hydrolysis of dihalogenanhydride of aromatic dicarboxylic acids.

According to the invention, the organic liquids used in the process are liquids miscible with water in the quantity not less than 25 per cent. Such liquids are aliphatic ketones (e.g., methylethylketone), alicyclic lower ethers (for example, tetrahydrofurane, dioxane), and also their mixtures.

The general principle in selecting the organic liquid during synthesis of polymers from dihalogenanhydrides is their ability to dissolve dihalogenanhydride and also inertness towards all starting components. The quantity of the organic liquid is not important. The quantity of water and of the organic liquid is taken at their volume ratio from 0.2 to 5.

In order to prepare high-molecular end product, preference in selecting the organic liquid should be given to such an organic liquid that dissolves the end product or causes its swelling.

Making use of systems consisting of water and water-miscible organic liquids for polycondensation of bis-phenols and dihalogenanhydrides of aromatic dicarboxylic acids is theoretically of low probability due to the high possibility of hydrolysis of dihalogenanhydride. It has been found that the introduction into the system water - water-miscible organic liquid of an additive of water-soluble salts of metals of the first and second groups of the Periodic System drastically decreases the relative share of dihalogenanhydride which undergoes hydrolysis.

The introduction into the reaction system of said salts during synthesis of aromatic polyesters with the purpose of preparing high-molecular polyesters has not been practiced before.

According to the invention, examples of such salts are KCl, CH$_3$COONa, NaCl, BaCl$_2$, and also their mixtures. The quantity of the additives (salts) is not of principal importance and it may vary within wide limits (over 5 per cent by weight) with respect to the quantity of water. There exists, however, a lower limit (for each salt) of salt content in the system, and if this lower limit is trespassed the molecular weight of the polyester is very low. The upper limit of the salt quantity is determined by its solubility in the system.

The result of the synthesis carried out under the thus selected conditions is the reaction mixture containing the end product. This reaction mixture is an emulsion which is ready for direct use. The emulsion consists of the organic and aqueous phases. The organic phase of the emulsion consists of a mixtures of the organic liquid taken for the synthesis, water (5–10 per cent by weight with respect to the organic phase) and the end product dissolved in this mixture. The aqueous phase is a solution of salts in a mixture of water and the organic liquid.

The end product can also be obtained as a solution or powder.

In order to prepare a solution of aromatic polyesters it is recommendable to settle said reaction mixture containing the end product so that the aqueous and organic phases are formed, the latter being a solution of the end product in a mixture of water and the organic liquid, as has been stated above. The phases are then separated. Said solution is stable in storage (to 30 days) and is ready for direct use.

Whenever necessary, aromatic polyesters can be prepared in the form of powder by precipitating them from emulsions or solutions. In order to prepare powder from emulsion, it is recommendable to add water to the reaction mixture, containing the end product (i.e., emulsion) and to separate the end product by passing the obtained suspension through a filter. (The quantity of water added is from 30 to 200 per cent by volume with respect to the reaction mixture).

The proposed method for preparing aromatic polyesters as compared with the known methods, does not require catalysts or emulsifying agents, and despite this it ensures preparation of the end product having high molecular weight (logarithmic viscosity to 2.5) at high yields (to 99.7 per cent). Thus-obtained product has high thermal stability (stands temperatures over 280°C).

Table 1 shows some characteristics of the proposed method, as compared to the inter-phase method for preparing aromatic polyesters in the system water-organic liquid immiscible with water. The Table is compiled with respect to the data obtained in preparing polyester of 4,4'-dioxydiphenylpropane with a mixture of dichloroanhydrides of iso- and terephthalic acids).

Table 1

| Nos | Specification | Water-organic liquid immiscible with water system | Water-organic liquid miscible with water system (NaCl as salt) |
|---|---|---|---|
| 1 | Organic liquid | xylene | tetrahydrofuran |
| 2 | Presence of catalyst, in % by wt of water | 5–10 | none |
| 3 | Synthesis time, min. | 45 | 6–10 |
| 4 | Washing procedures (for powder) | 10–15 | 3 |
| 5 | Yield of product, % of theory | 85–90 | 98–99 |
| 6 | Content of bis-phenol in effluents in % of starting quantity | 8–12 | 0.1–0.2 |

As it has already been said, emulsions and solutions of polyesters prepared by the proposed method are ready for immediate use. Owing to this fact, such labour-consuming operations of the inter-phase method as filtration and washing of the polymers swallen in water-immiscible organic liquid, stripping and distillation of organic liquids that destroy the end product under the action of the remaining quantities of alkali and elevated temperatures, are eliminated.

If the end product is prepared as powder, the operations of filtration and washing are less labour-consuming, and the time required to process the polymer is cut 3–5 times.

The high depth of completeness of the main reaction, the absence of catalysts or emulsifying agents, ensure the minimum contamination of the polymer and the effluents, which adds to the economy of the process.

For the purpose of comparison, Table 2 gives characteristics of polyester powder on the basis of 4,4'-dioxydiphenylpropane and dichloroanhydrides of iso-, and terephthalic acids (50:50) prepared by the proposed method as compared to the product obtained by the known inter phase method in the system xylene-water.

Table 2

| Nos | Characteristics | Aromatic polyester prepared in xylene-water system | tetrahydrofuran-water-salt system |
|---|---|---|---|
| 1 | Specific viscosity of 0.5% polymer solution in mixture with tetrachloroethane-phenol | to 0.8 | to 1.5 |
| 2 | X-ray structure | slightly crystalline | amorphous |
| 3 | Dispersity (mean particle size), mm | 0.7 | 0.2 |
| 4 | Bulk weight, g/cc | 0.17 | 0.37 |
| 5 | Loss in specific viscosity after treatment at 280°C, % of initial | 60 | 25 |

The high dispersity of the obtained aromatic polyesters offers good prospects for their use in the manufacture of antifriction self-lubricating plastics, for which the high degree of miscibility of the polymeric binder (in this case aromatic polyester) with the other components is guaranteed by high dispersity. Owing to high dispersity and increased thermal stability, powdered polyesters according to the invention are readily pelletized and granulated, and can successfully be used for the manufacture of plastics by pressing, moulding, extrusion. Below given are mechanical characteristics of a plastic material prepared by moulding polyester on the basis of 4,4'-dioxydiphenylpropane and a mixture of dichloroanhydrides of iso-, and terephthalic acids:

| 1. | Ultimate compression strength, kg/sq.cm | 900 |
|---|---|---|
| 2. | Ultimate tensile strength, kg/sq.cm | 700 |
| 3. | Ultimate flexural strength, kg/sq.cm | 1100–1200 |
| 4. | Impact strength, kg-cm/sq.cm: | |
|   | for a notched specimen | 15 |
|   | for a solid specimen | specimen remains intact |
| 5. | Vicat softening temperature, °C | 200–210 |

The above data indicate that the mechanical properties of the plastic on the basis of said aromatic polyester are not inferior to those in the widely known high-strength plastics, viz., polycarbonates, while its thermal stability is significantly higher. (On the basis of the other bis-phenols, for example, phenolphthalein 9,9'-(4-oxyphenyl)fluorene, plastics and other articles can be prepared, in which the Vicat softening temperature is as high as 300° – 350°C.

Aromatic polyesters prepared by the proposed method can be worked into films both by the pouring and by the extrusion method. The specifications of such films made from aromatic polyesters on the basis of 4,4'-dioxydiphenylpropane and a mixture of dichloroanhydrides of iso-, and terephthalic acids (obtained by the casting method) are as follows:

| 1. | Ultimate tensile strength, kg/sq.cm | 700 |
|---|---|---|

-continued

| 2. | Percentage elongation | 10–20 |
|---|---|---|
| 3. | Volume resistivity Ohm.cm | $10^{16}$ |
| 4. | Dielectric constant | 3 |
| 5. | Dielectric strength for a 30-micron thick specimen, kV/mm | 100 |

The proposed method can be realized as this.

Bis-phenol, a water-soluble salt, and alkali are dissolved, either in succession or simultaneously, in water or in a mixture of water and an organic liquid. Dihalogenanhydride of aromatic dicarboxylic acid is also dissolved in the organic liquid. The obtained solutions are poured together with stirring. Stirring is continued for 2 – 60 minutes, with the result that an emulsion is formed which contains high-molecular end product. The process is carried out at a temperature of −10° to +30°C, preferably at −10° to +10°C. All the named components can be taken separately or as mixtures with compounds of the same class.

The order in which the components are loaded does not matter. It may be as follows:

1. Dissolution of bis-phenol in an organic liquid (solution A); dissolution of alkali and salt in water (solution B); mixing together solutions A and B; dissolution of dihalogenanhydride in an organic liquid (solution C); adding solution C to a solution (A+B).

2. Adding solution (A+B) to solution C.

3. Dissolution of bis-phenol in an aqueous solution of alkali and salt and its mixing with solution of dihalogenanhydride in an organic liquid.

The preferable order of operations is that described in Item 1.

The obtained reaction mixture contains the end product and is actually an emulsion ready for direct use.

In order to prepare a solution, the emulsion is separated (by setting) into an organic and an aqueous phases. Said phases are separated from each other. The organic phase, which is a solution of polymer in an organic liquid and water, can also be used as such.

Whenever necessary, the polymer can be prepared as a powder. To that end, to the obtained reaction mixture added is water in the quantity from 30 to 200 per cent of the reaction mixture volume. The result is a suspension which is then filtered to isolate the end product. The polymer is washed, for example, with water, and dried.

For a better understanding of the invention, the following examples of its practical embodiment are given by way of illustration.

The values of logarithmic viscosity $[\eta]_{inh}$ are obtained from the values of specific viscosities of the polymer solution (0.5 g/100 cc of solvent) at 250°C. The solvent is a mixture of tetrachloroethane and phenol (2:3).

The yields of the polymer in per cent are given with respect to theory.

EXAMPLE 1

17.1 g of 4,4'-dioxydiphenylpropane are dissolved in 50 cc of tetrahydrofuran. To the obtained solution of bis-phenol added are 150 cc of an aqueous solution containing 6.6 g of NaOH and 18 g of KCl. 7.67 g of dichloroanhydride of isophthalic acid and 7.67 g of dichloroanhydride of terephthalic acid are dissolved in 100 cc of tetrahydrofuran at a temperature of −10°C.

The obtained solution of dichloroanhydride is added with stirring to the solution of bis-phenol, salt and alkali, cooled to +5°C. After pouring together the solutions, stirring is continued for another 2–3 minutes. The result of this process is an emulsion ready for use.

To this emulsion added with stirring are 150 cc of water to prepare a suspension of the polymer which is separated by filtration. The polymer is washed with water and dried.

$[\eta]_{inh}$ of the polymer is 1.20. The yield of the polymer is 99.4 per cent.

EXAMPLE 2

3.98 g of phenolphthalein are dissolved in 20 cc of tetrahydrofuran and to the obtained solution added are 30 cc of an aqueous solution containing 1.1 g of NaOH and 6.7 g of NaCl. 2.3 g of dichloroanhydride of terephthalic acid are dissolved in 30 cc of tetrahydrofuran at a temperature of −10°C.

The obtained solution of dichloroanhydride is added with stirring to the solution of bis-phenol, salt, and alkali, at a temperature of 20°C. After pouring together the solutions, stirring is continued for another 2–3 minutes to prepare emulsion which is an organic phase containing the polymer (8 per cent), tetrahydrofuran (87 per cent), water (5 per cent) and an aqueous phase which is an aqueous solution containing salts (22 per cent), tetrahydrofuran (8 per cent) and an insignificant amount of alkali which is neutralized with acetic acid. After settling and decanting the aqueous phase, an organic phase which is a solution of the polymer in tetrahydrofuran and water is isolated. The solution is ready for use. It can be used to manufacture articles of various configurations.

$[\eta]_{inh}$ of the polymer is 1.17.

EXAMPLE 3

3.8 g of 4,4'-dioxydiphenylpropane and 2.06 g of KOH are dissolved in 25 cc of water and to the obtained solution added are 25 cc of an aqueous solution containing 7 g of NaCl. 2.92 g of difluoroanhydride of isophthalic acid are dissolved in 50 cc of tetrahydrofuran at a temperature of 10°C. The obtained solution of difluoranhydride is added with stirring to the solution of bis-phenol, alkali and salt cooled to +5°C. After pouring together the solutions, stirring is continued for another 2–5 minutes, to prepare emulsion which is ready for use.

100 cc of water are added with stirring to the emulsion to prepare a suspension of the polymer from which it is separated by filtration. The polymer is washed with water and dried.

$[\eta]_{inh}$ of the polymer is 0.67. The yield is 98.5 per cent.

EXAMPLE 4

5.7 g of 4,4'-dioxydiphenylpropane are dissolved in 50 ml of cc of tetrahydrofuran. To the obtained solution of bis-phenol added are 45 cc of an aqueous solution containing 2.25 g of NaOH and 9 g of NaCl.

2.58 g of dichloroanhydride of isophthalic acid and 2.58 g of dichloroanhydride of terephthalic acid are dissolved in 55 cc of tetrahydrofuran at a temperature of −10°C. The obtained solution of dichloroanhydride is added with stirring to the solution of bis-phenol, salt and alkali at a temperature of +20°C. After pouring together the solutions, stirring is continued for another 2–5 minutes. The result of the process is emulsion which is an organic phase containing the polymer (12 per cent), tetrahydrofuran (83 per cent), water (5 per cent), and an aqueous phase which is an aqueous solution containing salt (22 per cent), tetrahydrofuran (10 per cent), and insignificant quantity of alkali which is neutralized with acid acetic acid. After settling and decanting the aqueous phase, an organic phase, i.e., solution of polymer in tetrahydrofuran and water is obtained. The solution is ready for use. Articles of various configurations are manufactures therefrom.

$[\eta]_{inh}$ of the polymer is 1.89.

EXAMPLE 5

1.51 g of 2-β-oxyethyl-3-3'-bis(4-oxyphenyl)phthalimidine and 0.95 g of 4,4'-dioxydiphenylpropane are dissolved in 30 cc of tetrahydrofuran. To the obtained solution of bis-phenol added are 30 cc of aqueous solution containing 0.72 g of NaOH and 5.5 g of NaCl.

1.72 g of dichloroanhydride of terephthalic acid are dissolved in 40 cc of tetrahydrofuran at a temperature of 10°C, the obtained solution of dichloroanhydride is added with stirring to the solution of bis-phenol, salt and alkali, at a temperature of 30°. After pouring together, stirring is continued for another 2–3 minutes. The result is suspension of the polymer which is separated by filtration. The polymer is washed with water and dried. $[\eta]_{inh}$ of the polymer is 1.15. The yield of the polymer is 97 per cent.

EXAMPLE 6

3.8 g of 4,4'-dioxydiphenylpropane, 9 g of NaCl and 1.5 g of NaOH are dissolved in a mixture consisting of 30 cc of methylethylketone and 50 cc of water. 1.72 g of dichloroanhydride of isophthalic acid and 1.72 g of dichloroanhydride of terephthalic acid are dissolved in 20 cc of tetrahydrofuran at a temperature of −10°C. The obtained solution of dichloroanhydride is added with stirring to the solution of bis-phenol, salt, and alkali, at a temperature of +20°C. After pouring together, the solution is stirred for another 3–5 minutes. The result is emulsion which is ready for use. To the emulsion added with stirring are 200 cc of water. The result is suspension of the polymer which is separated by filtering. The polymer is washed with water and dried. $[\eta]_{inh}$ of the polymer is 0.64.

EXAMPLE 7

3.38 g of dichloroanhydride of terephthalic acid are dissolved in 50 cc of tetrahydrofuran at a temperature of −10°C. Then 5.9 of 9,9'-bis(4-oxyphenyl)fluorene, 1.5 g of NaOH and 7 g of KCl are dissolved in 50 cc of water at a temperature of +20°C. The obtained solution of bis-phenol, alkali and salt is added with stirring to the solution of dichloroanhydride. After pouring together the solutions, stirring is continued for another 3–5 minutes. The resultant emulsion is ready for use. To the emulsion added with stirring are 50 cc of water. As a result, a suspension of the polymer is prepared, which is then separated by filtering. The polymer is washed with water and dried.

$[\eta]_{inh}$ of the polymer is 0.60.

EXAMPLE 8

3.8 g of 4,4'-dioxydiphenylpropane are dissolved in 25 cc of water containing 0.92 g of LiOH. To the obtained solution of bis-phenol added are 25 cc of an aqueous solution containing 6 g of LiCl. Then, 1.72 g of dichloroanhydride of isophthalic acid and 3.64 g of dichloroanhydride of diphenylhexafluoropropanedicarboxylic acid are dissolved in 60 cc of tetrahydrofuran at a temperature of −10°C. The obtained solution of dichloroanhydride is added with stirring to the solution of bis-phenol, salt, and alkali, at a temperature of 10°C. After pouring the solutions together, the mixture is stirred for another 3–5 minutes. The resultant emulsion is ready for use. To the emulsion added with stirring are 220 cc of water to prepare a suspension of the polymer which is separated by filtration. The polymer is washed with water and dried. $[\eta]_{inh}$ of the polymer is 0.73.

Examples 9 through 19 were carried out under the same conditions as in Example 1. The results of the experiments are summarized in Table 3.

Table 3

| Nos 1 | Bis-phenol, in g 2 | Alkali, in g 3 | Salt, in g 4 | Dihalogenanhydride, in g 5 |
|---|---|---|---|---|
| 9 | 11.41 of dioxydiphenylpropane | 4.4 of NaOH | 10 of KCl | 5.13 of isophthalic dichloroanhydride |
|   |   |   | 15 of NaCl | 6.38 of naphthalenedicarboxylic dichloroanhydride |
| 10 | ditto | 6.18 of KOH | 10 of NaCl | 1.56 of isophthalic dichloroanhydride |
|   |   |   | 10 of BaCl | 8.70 of terephthalic dichloroanhydride |
| 11 | ditto | 4.4 of NaOH | 18 of LiCl | 5.13 of isophthalic dichloroanhydride |
|   |   |   |   | 7.45 of diphenyloxide-4,4'-of dicarboxylic dichloroanhydride |
| 12 | ditto | 4.4 of NaOH | 25 of KBr | 10.26 of terephthalic dichloroanhydride |
| 13 | ditto | 4.4 of NaOH | 20 of NaCl | 5.13 of terephthalic dichloroanhydride |
|   |   |   |   | 4.35 of isophthalic difluoroanhydride |
| 14 | 3.8 of ditto | 1.1 NaOH | 6.6 of NaCl | 5.18 of benzophenondicarboxylic dichloroanhydride |
| 15 | ditto | 0.92 of LiOH | 6 of LiCl | 1.72 of isophthalic dichloroanhydride |
|   |   |   |   | 2.60 of benzophenondicarboxylic dichloroanhydride |
| 16 | 5.42 of resorcinol | 4.4 of NaOH | 30 of BaCl | 5.13 of isophthalic dichloroanhydride |
|   |   |   |   | 5.13 of terephthalic dichloroanhydride |
| 17 | 11.41 of dioxydiphenylpropane | 4.5 of NaOH | 20 of K₂CO₃ | ditto |
| 18 | ditto | ditto | 50 of NaNO₃ | ditto |
| 19 | ditto | 4.7 of NaOH | 20 of Ca(CH₃COO)₂ | ditto |

| Nos 1 | Organic liquid, cc 6 | Water, cc 7 | [η]inh 8 | Yield of polymer, % of theory 9 |
|---|---|---|---|---|
| 9 | 150 of tetrahydrofuran | 150 | 2.53 | 99.5 |
| 10 | ditto | 100 | 1.18 | 98 |
| 11 | ditto | 150 | 1.75 | 98 |
| 12 | ditto | 100 | 0.90 | 97 |
| 13 | 210 of ditto | 90 | 0.75 | 99 |
| 14 | 50 | 50 | 0.80 | 97 |
| 15 | 50 of dioxane | 50 | 0.76 | 99 |
| 16 | 150 of tetrahydrofuran | 150 | 0.82 | 98 |
| 17 |   |   | 0.96 | 98 |
| 18 |   |   | 1.09 | 97 |
| 19 |   |   | 0.78 | 97 |

We claim:

1. A method for preparing aromatic polyesters consisting in the interaction between bis-phenols and dihalogenanhydrides of aromatic dicarboxylic acids taken at the molar ratio from 0.9 to 1.1, at a temperature from −10° to +30°C, in the presence of alkali taken in the quantity of 2 – 2.5 mole per mole of bis-phenols, in the system water-organic liquid at their molar ratio from 0.2 to 5; said organic liquid is capable of dissolving dihalogenanhydrides of dicarboxylic acids, is chemically inactive towards the starting components, and is miscible with water in the quantity not less than 25 per cent; the said starting components are reacted in the presence of water-soluble salts of metals selected from the first and second groups of the Periodic System and taken in the quantity from 5 to 45 per cent by weight with respect to the quantity of water; as a result a reaction mixture containing the end product is obtained.

2. A method according to claim 1, wherein the reaction mixture containing the end product is settled to separate into an aqueous and an organic phase, the latter containing organic liquid, water, and the end product; said phases are separated from each other.

3. A method according to claim 1, wherein the reaction mixture containing the end product is mixed with water in the quantity from 30 to 200 per cent by volume with respect to said reaction mixture; the resulting suspension is filtered, to separate the end product in the form of powder.

* * * * *